(12) United States Patent
Takada et al.

(10) Patent No.: US 7,961,855 B2
(45) Date of Patent: Jun. 14, 2011

(54) VOICE COMMUNICATIONS APPARATUS

(75) Inventors: Masashi Takada, Tokyo (JP); Hiromi Aoyagi, Kanagawa (JP); Kazuyoshi Akie, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 12/805,006

(22) Filed: Jul. 7, 2010

(65) Prior Publication Data

US 2010/0272248 A1      Oct. 28, 2010

Related U.S. Application Data

(63) Continuation of application No. 11/165,436, filed on Jun. 24, 2005, now Pat. No. 7,792,255, which is a continuation of application No. PCT/JP03/16546, filed on Dec. 24, 2003.

(30) Foreign Application Priority Data

Dec. 27, 2002   (JP) ................................ 2002-379082
Mar. 17, 2003   (JP) ................................ 2003-071826

(51) Int. Cl.
    *H04M 11/00*       (2006.01)
(52) U.S. Cl. ..................................... 379/93.01; 370/355
(58) Field of Classification Search .................. 370/352, 370/354, 355, 356, 358; 379/90.01, 93.01, 379/93.05, 93.06, 93.07, 93.08, 93.09
    See application file for complete search history.

(56) References Cited

U.S. PATENT DOCUMENTS

| | | | |
|---|---|---|---|
| 5,070,524 A | | 12/1991 | Mano |
| 5,790,604 A | * | 8/1998 | Kelton et al. ................. 375/344 |
| 6,175,565 B1 | * | 1/2001 | McKinnon et al. ........... 370/354 |
| 6,288,610 B1 | * | 9/2001 | Miyashita ..................... 330/149 |
| 6,480,581 B1 | * | 11/2002 | Wu et al. ..................... 379/93.01 |
| 6,791,973 B1 | * | 9/2004 | Yahiro ........................ 370/352 |
| 6,826,174 B1 | | 11/2004 | Erekson et al. |
| 7,167,451 B1 | | 1/2007 | Oran |
| 7,391,761 B1 | * | 6/2008 | Ruckart et al. ................ 370/352 |
| 7,508,928 B1 | | 3/2009 | Everson et al. |
| 7,542,554 B2 | | 6/2009 | Binder |
| 7,567,548 B2 | * | 7/2009 | Reynolds et al. ............. 370/352 |
| 7,574,001 B2 | * | 8/2009 | Fallahi et al. ................. 379/398 |
| 2002/0106072 A1 | | 8/2002 | Apfel |

(Continued)

FOREIGN PATENT DOCUMENTS

EP          0 781 022         6/1997

(Continued)

OTHER PUBLICATIONS

Takahiro Kikuchi et al., "IP Telephony Becomes Real", Technical journal Nikkei Electronics No. 829, Business Publications, Inc., Japan, Aug. 26, 2002, vol. 829, pp. 109-135.

(Continued)

*Primary Examiner* — Olisa Anwah
(74) *Attorney, Agent, or Firm* — Rabin & Berdo, PC

(57) ABSTRACT

Voice communications apparatus intervenes between a telephone set and a broad-band transmission path that has a communication band broader than a voice band limited by the transmitter and receiver characteristics of the telephone set. The voice communications apparatus includes a transmitter frequency characteristic corrector circuit for correcting the frequency characteristic of a signal input from the telephone set, and a receiver frequency characteristic corrector circuit for correcting the frequency characteristic of a signal to be input to the telephone set.

16 Claims, 8 Drawing Sheets

U.S. PATENT DOCUMENTS

| | | | |
|---|---|---|---|
| 2003/0045259 A1* | 3/2003 | Kimata | 455/260 |
| 2004/0131165 A1 | 7/2004 | Ebisawa et al. | |
| 2004/0170268 A1 | 9/2004 | Hakusui | |
| 2004/0174982 A1 | 9/2004 | Apfel | |
| 2004/0240432 A1 | 12/2004 | Ying et al. | |
| 2005/0047574 A1 | 3/2005 | Reid | |
| 2006/0268836 A1 | 11/2006 | Prentice | |
| 2008/0260139 A1 | 10/2008 | Ruckart et al. | |

FOREIGN PATENT DOCUMENTS

| | | |
|---|---|---|
| EP | 0781022 A2 | 6/1997 |
| JP | 5347661 A | 12/1993 |
| JP | 6030090 A | 2/1994 |
| JP | 8139789 A | 5/1996 |
| JP | 9261517 A | 10/1997 |
| JP | 2001036625 A | 2/2001 |
| JP | 2001148723 A | 5/2001 |
| JP | 2001-257797 A | 9/2001 |
| JP | 2001249664 A | 9/2001 |

OTHER PUBLICATIONS

Takahiro Kikuchi et al., "IP Telephony Becomes Real", Technical journal Nikkei Electronics No. 829, Nikkei Business Publications, Inc., Japan, Aug. 26, 2002, vol. 829, pp. 109-135.

"Telephone Revolution—PC and PDA push for VoIP, whereas Audio-Video Equipment waits and sees", Technical journal Nikkei Electronics No. 804, Nikkei Business Publications, Inc., Japan, Sep. 10, 2001, vol. 804, pp. 134-141.

* cited by examiner

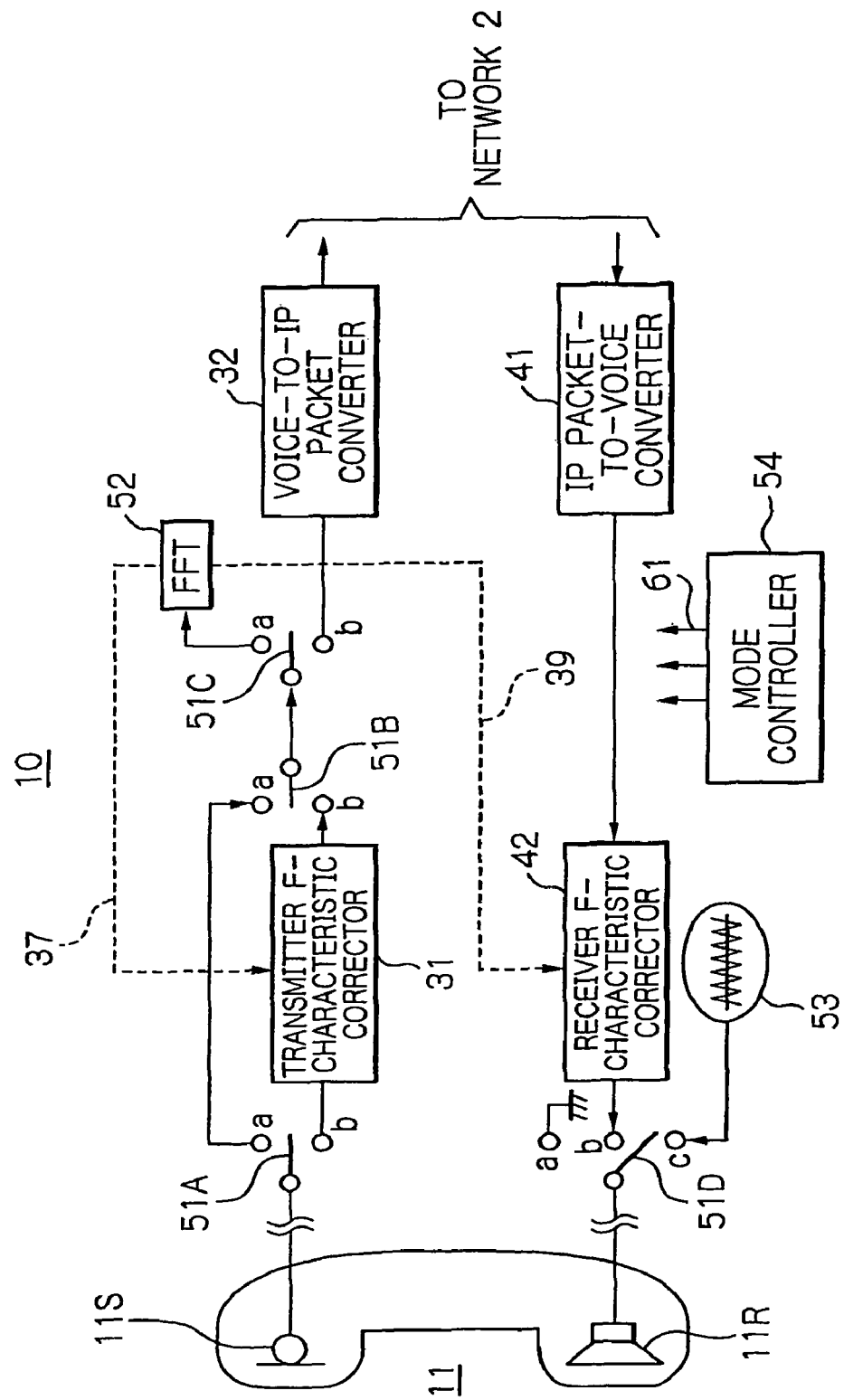

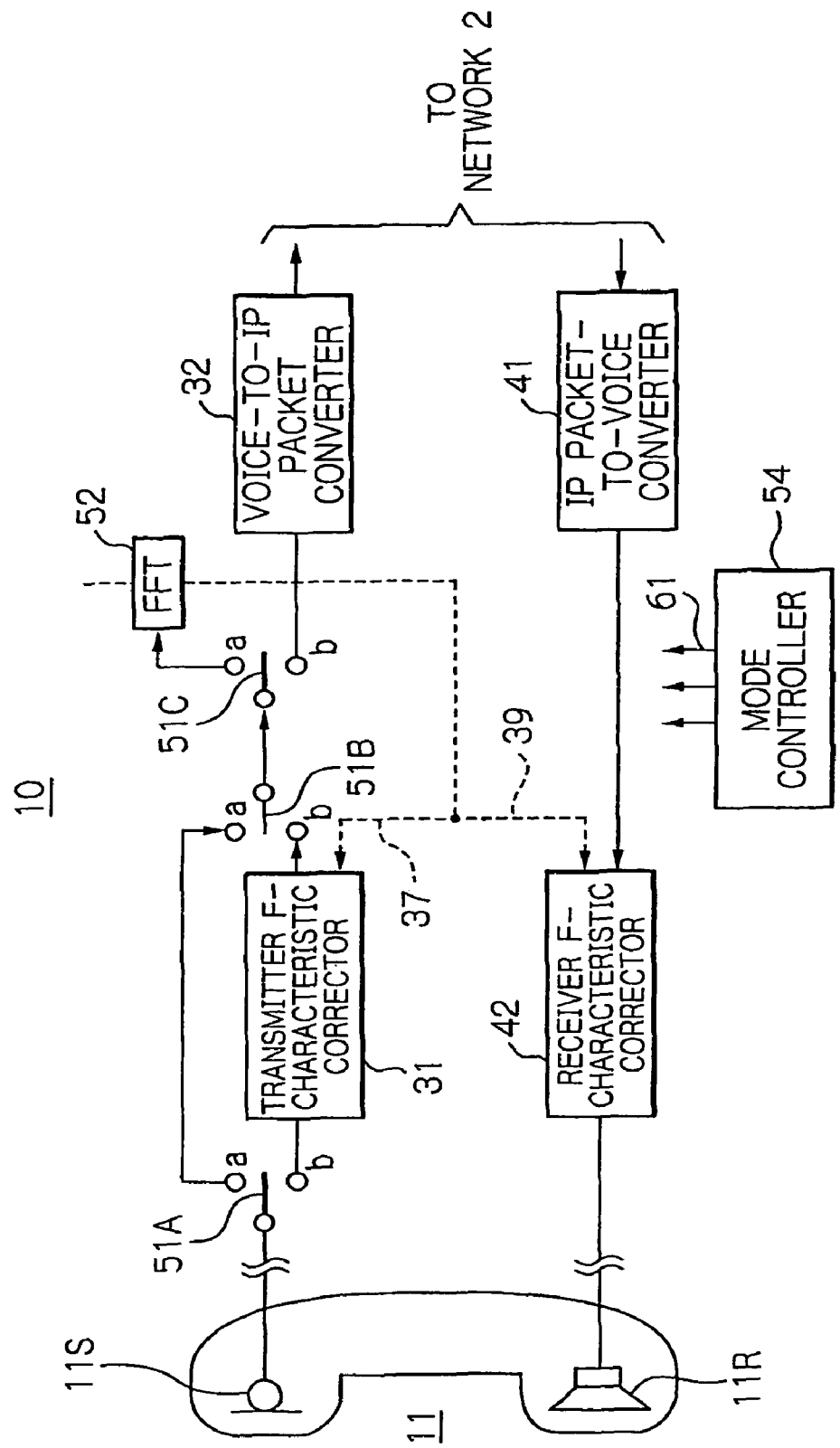

US 7,961,855 B2

VOICE COMMUNICATIONS APPARATUS

CROSS REFERENCE TO RELATED APPLICATION

This is a continuation of co-pending application Ser. No. 11/165,436, filed Jun. 24, 2005, and claims the benefit of Japanese application Serial No. 2002-379082, filed Dec. 27, 2002, and Japanese application Serial No. 2003-71826, filed Mar. 17, 2003, the subject matters of which are incorporated herein by reference.

BACKGROUND OF THE INVENTION

1. Field of the Invention

The present invention relates to a voice communications apparatus, and more particularly, to a voice communications apparatus built in, or accommodating, a telephone set and also to a voice communications system including the same.

2. Description of the Background Art

Today, VoIP (Voice over Internet Protocol), i.e. voice communications using Internet or similar IP (Internet Protocol) network is spreading. Even for voice communications using an IP network, it is necessary to transmit voice signals limited in frequency band up to 4 kHz, i.e. so-called telephone-band signals. This is because voice signals higher than 4 kHz are inhibited from being input to a wired transmission path or general public switched telephone network. By contrast, an IP network is free from such a limitation and can implement voice communications using a broad band, i.e. signals lying in a frequency band above 4 kHz.

More specifically, as shown in FIG. 2, a conventional telephone set, as distinguished from an IP telephone set exclusively connectable to an IP network, has a transmitter characteristic that limits a broad-band signal input to its microphone to 4 kHz or below. As also shown in FIG. 2, the receiver characteristic of the conventional telephone set limits a signal received over its transmission path to 4 kHz or below before the signal is output from its earphone or loudspeaker. As a result, even when the transmission path allows signals above 4 kHz to be transmitted like with an IP network, voice quality achievable is not higher than when the transmission path is a general public switched telephone network. The transmitter and receiver characteristics stated above are implemented by band-pass filters by way of example.

In the above circumstances, high-quality communications using broad-band signals are not attainable with an IP network unless a telephone set itself is provided with a transmitter and a receiver characteristic adaptive to a broad band. However, with many of conventional telephone sets, it is impossible to enjoy high voice quality particular to an IP network or similar transmission path, which allow broadband signals, due to the transmitter and receiver characteristics that limit the frequency band to 4 kHz or below, as stated above.

SUMMARY OF THE INVENTION

It is an object of the present invention to provide voice communications apparatus realizing high voice quality even when the conventional telephone set uses an IP network or similar transmission path that allows broad-band signals to be transmitted, and a voice communications system including the same.

Voice communications apparatus of the present invention intervenes between a telephone and a broad-band transmission path that has a communication band broader than a voice band limited by the transmission and receiver characteristics of the telephone. The voice communications apparatus includes a transmitter frequency characteristic corrector circuit for correcting the frequency characteristic of a signal input from the telephone, and a receiver frequency characteristic corrector circuit for correcting the frequency characteristic of a signal to be input to the telephone.

Preferably, the transmitter frequency characteristic corrector circuit has a first correction frequency characteristic such that a composite frequency characteristic of the first correction frequency characteristic with the transmitter characteristic is flat in a communication band of the broad-band communication path, and the receiver frequency characteristic corrector circuit has a second correction frequency characteristic such that a composite frequency component of the second correction frequency characteristic with the receiver characteristic is flat in the communication band of the broadband communication path.

A voice communications system including the above voice communications apparatus is also provided.

BRIEF DESCRIPTION OF THE DRAWINGS

The objects and features of the present invention will become more apparent from consideration of the following detailed description taken in conjunction with the accompanying drawings in which:

FIG. 9 is a schematic block diagram showing another alternative embodiment of the present invention;

FIG. 10 is a schematic block diagram, similar to FIG. 9, showing still another alternative embodiment of the present invention.

DESCRIPTION OF THE PREFERRED EMBODIMENTS

Figure 1:
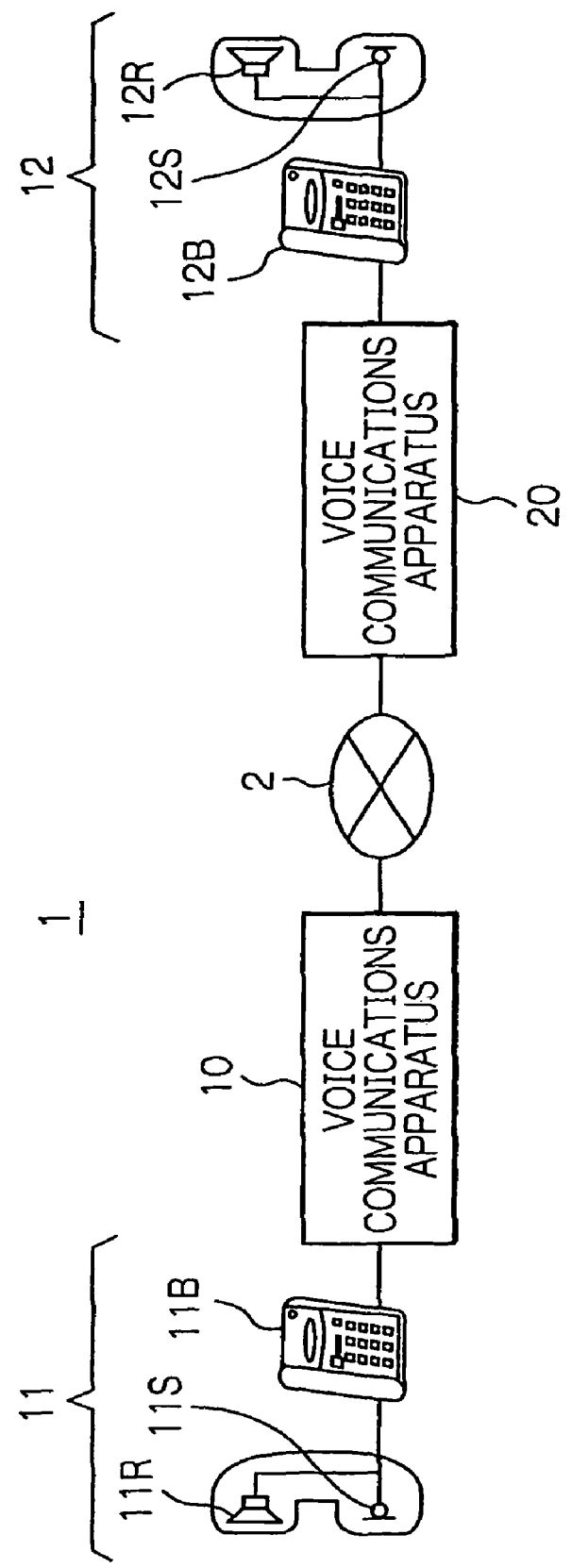
FIG. 1 is a schematic block diagram showing an embodiment of the voice communications system in accordance with the present invention.
Figure 2:
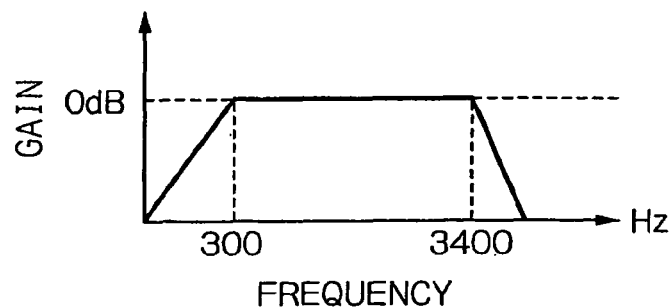
FIG. 2 exemplarily plots a transmitter and a receiver characteristic particular to a conventional telephone set.

Referring to FIG. 1 of the accompanying drawings, a preferred embodiment of the voice communication system in accordance with the present invention is generally designated with the reference numeral 1. As shown, the voice communications system 1 is adapted to allow voice signals to be transmitted over an IP network 2 between specific two end nodes among a plenty of end nodes, not shown, interconnected to the network 2.

One of the end nodes includes a voice communications apparatus 10 and a telephone set 11 accommodated in the voice communications apparatus 10. Likewise, the other of the end nodes includes a voice communications apparatus 20 and a telephone set 12 accommodated in the voice communications apparatus 20. It is to be noted that the telephone sets 11 and 12 may be implemented by, e.g. facsimile or other types of telephony apparatus so long as they transmit signals lying in the voice frequency band limited by a general public switched telephone network.

In the illustrative embodiment, the telephone sets 11 and 12 are conventional telephone sets each having a transmitter and a receiver characteristic that limit the frequency band to 4 kHz or below. For this reason, arrangements inside the telephone sets 11 and 12 are not shown in FIG. 1 nor will be described specifically.

Figure 3A:
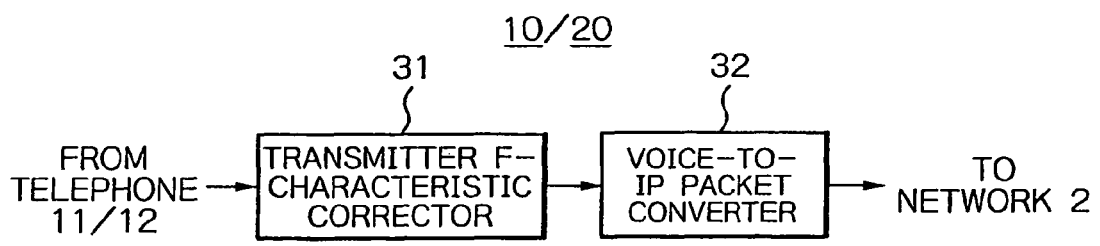
FIGS. 3A and 3B are schematic block diagrams each showing particular part of a voice communications apparatus included in the embodiment shown in FIG. 1.
Figure 3B:
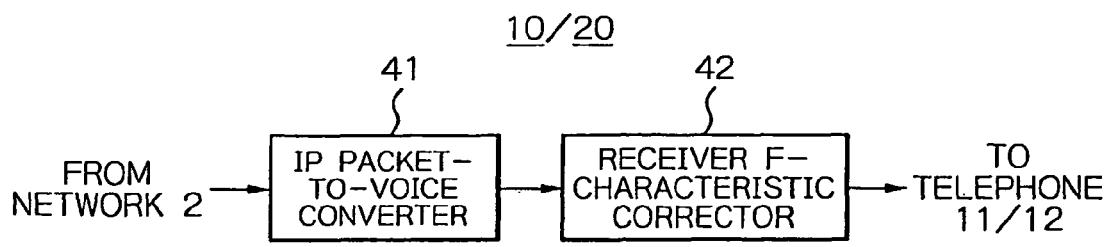

Each of the voice communications apparatus 10 and 20 is configured to process a voice signal in matching relation to broad-band communications available with the IP network 2. FIGS. 3A and 3B respectively show a transmitter system and a receiver system unique to each of the voice communications apparatus 10 and 20.

Figure 4A:
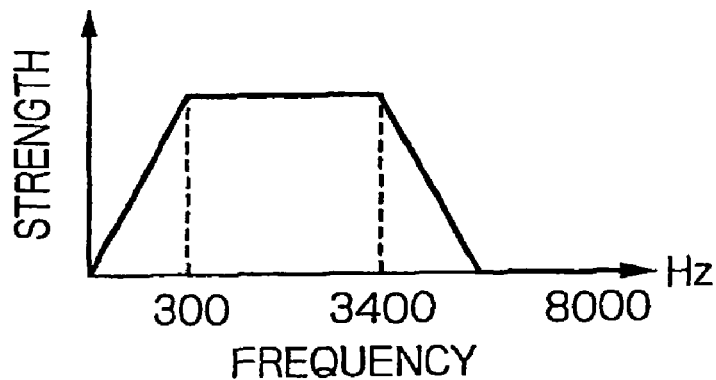
FIGS. 4A, 4B and 4C are graphs useful for understanding the function of a transmitter frequency characteristic corrector included in the embodiment.
Figure 4B:
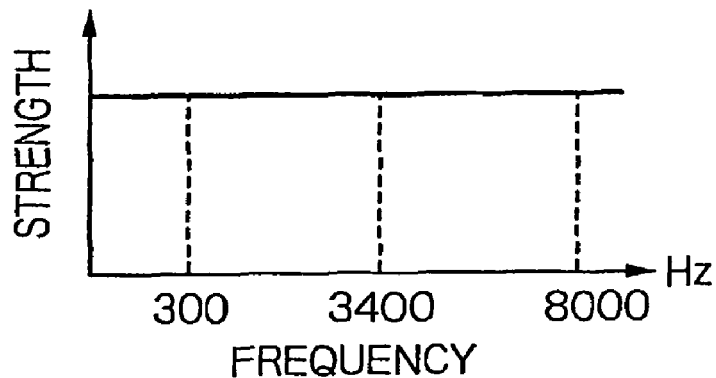
Figure 4C:
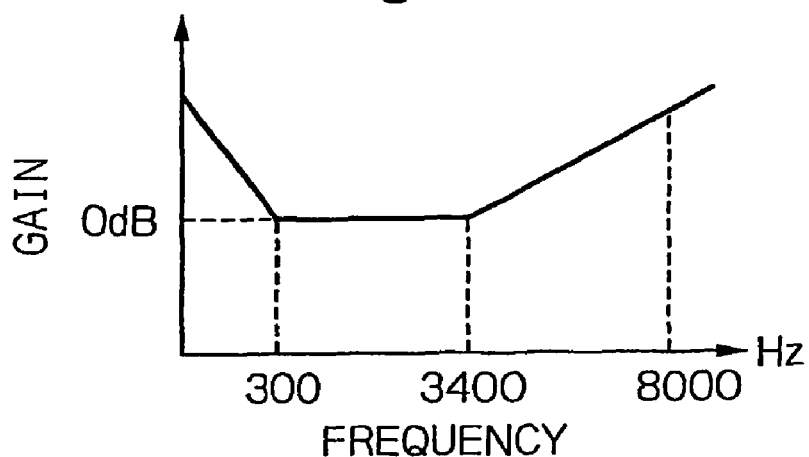

As shown in FIG. 3A, the transmitter system of the voice communications apparatus 10 or 20 includes a transmitter F (Frequency) characteristic corrector circuit 31 and a voice signal-to-IP packet converter circuit 32 interconnected as illustrated. The transmitter F characteristic corrector circuit 31 is implemented by, e.g. an analog or a digital filter and adapted to make the frequency of a voice signal output from the telephone set 11 or 12, which is associated with the transmission line, flat over the entire voice frequency band. FIG. 4A exemplarily plots a specific voice signal frequency characteristic limited in frequency band in consideration of a general public switched telephone network applicable to the telephone set 11 or 12. The transmitter F characteristic corrector circuit 31 partially enhances the gain of the limited frequency bands shown in FIG. 4A to thereby restore non-limited frequency bands, as shown in FIG. 4B. FIG. 4C plots a correction frequency characteristic assigned to the transmitter. F characteristic corrector circuit 31.

While the voice band is shown as ranging from 0 Hz to 8,000 Hz in FIGS. 4A, 4B and 4C, such a voice band ranging is only illustrative. Also, the transmitter F characteristic corrector circuit 31 may not correct the frequency characteristic to be perfectly flat but distorted to some extent.

Generally, the types, or characteristics, of the telephone sets 11 and 12, respectively connected to the voice communications apparatus 10 and 20, may not be fixed. In light of this, the transmitter F characteristic corrector circuit 31 should preferably be configured to be capable of varying the correction frequency characteristic, so that an engineer, for example, can manipulate its adjuster element to adjust the characteristic at the installation site.

The voice signal-to-IP packet converter circuit 32 is adapted to convert a voice signal corrected in frequency characteristic by the transmitter F characteristic corrector circuit 31 to IP packets.

On the other hand, the receiver system of the voice communications apparatus 10 or 20 shown in FIG. 3B includes an IP packet-to-voice signal converter circuit 41 and a receiver F characteristic corrector circuit 42 interconnected as illustrated. The IP packet-to-voice signal converter circuit 41 is adapted for decomposing IP packets coming in from the IP network 2 to restore an original voice signal. The voice signal thus restored has its frequency characteristic which has been corrected by the transmitter F characteristic corrector circuit 31, and is therefore similar, or corresponding, to the frequency characteristic of the voice signal output from the corrector circuit 31.

Figure 5A:
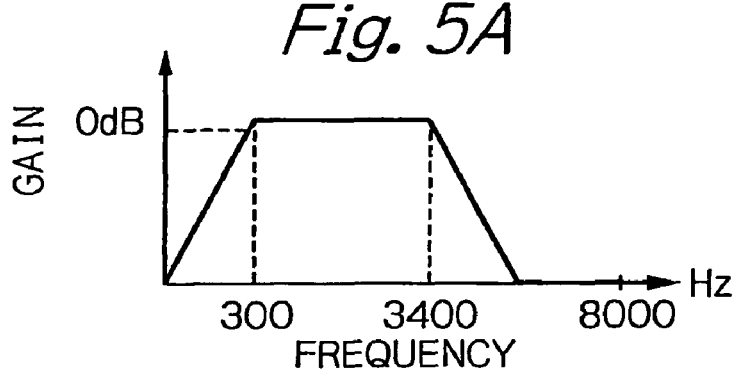
FIGS. 5A, 5B and 5C are graphs useful for understanding the function of a receiver frequency characteristic corrector also included in the embodiment.
Figure 5B:
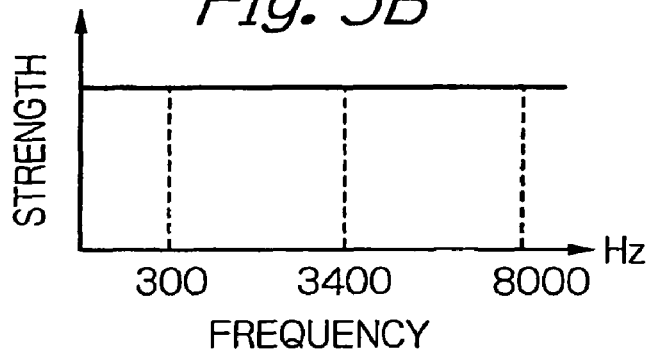
Figure 5C:
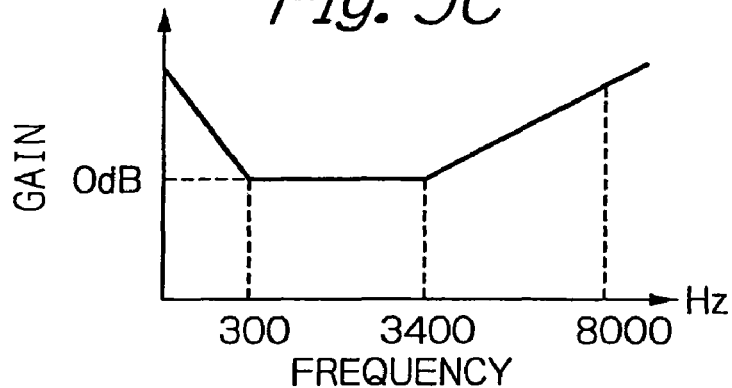

The receiver F characteristic corrector circuit 42 is implemented by, e.g. an analog filter. Giving consideration to the receiver characteristic of the associated telephone set 11 or 12, the receiver F characteristic corrector circuit 42 is adapted to partially raise beforehand frequency band components that will be attenuated by the receiver characteristic of the telephone set 11 or 12. For example, in an application in which the telephone set 11 or 12 has a receiver characteristic shown in FIG. 5A and selected in consideration of a general public switched telephone network, then, as for the frequency characteristic of the voice signal output from the IP packet-to-voice signal converter circuit 41, FIG. 4B, the receiver F characteristic corrector circuit 42 raises beforehand frequency band components that will be attenuated by the above receiver characteristic, thus producing a voice signal having a frequency characteristic shown in FIG. 5B. FIG. 5C shows a correction frequency characteristic assigned to the receiver F characteristic corrector circuit 42. Again, while the voice band is shown as ranging from 0 Hz to 8,000 Hz in FIGS. 5A, 5B and 5C, such a voice band is only illustrative.

The types or characteristics of the telephone sets 11 and 12, respectively connected to the voice communication apparatus 10 and 20, may not be fixed, as stated earlier. Therefore, the receiver F characteristic corrector circuit 42 should also preferably be configured to be capable of varying the correction frequency characteristic, so that an engineer, for example, can adjust the above characteristic at the installation site by means of manipulating its adjuster elements.

In operation, when a subscriber on the one telephone set 11 intends to transmit voice signals to the other telephone set 12, for example, voice uttered by the subscriber is captured by a microphone or transmitter 11S, FIG. 1, and converted to an electric voice signal thereby. Subsequently, the telephone circuit, not shown, of a telephone set body 11B of the transmitting station 11 limits the frequency band of the voice signal in matching relation to a general public switched telephone network applicable thereto.

Figure 6:
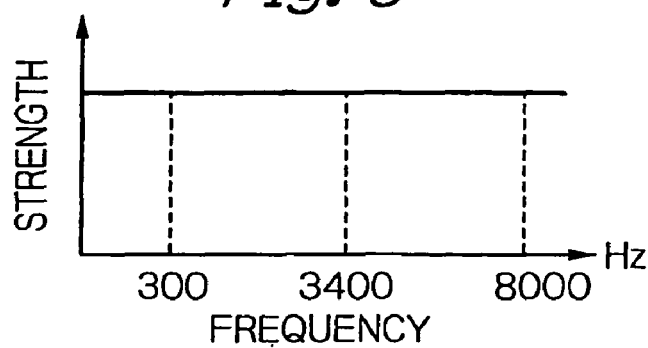
FIG. 6 plots a specific frequency characteristic of an input voice signal, useful for understanding the operation of the embodiment.

If the voice signal output from the microphone 11S has a flat frequency characteristic throughout the entire voice band, e.g. in a frequency band below 8 kHz inclusive, as shown in FIG. 6, then the voice signal thus limited in frequency by the telephone set body 11B has a lower-frequency component below 300 Hz inclusive and a higher-frequency component above 3,400 Hz inclusive attenuated, as shown in FIG. 4A. The voice signal output from the telephone set body 11B is in turn input to the voice communications apparatus 10.

In the voice communications apparatus 10, the transmitter F characteristic corrector circuit 31 corrects the frequency characteristic of the input voice signal in accordance with its own correction frequency characteristic, see FIG. 4C. As a result, a voice signal with a frequency characteristic that is flat throughout the entire voice band, as shown in FIG. 4B, is output from the transmitter F characteristic corrector circuit 31.

Subsequently, the voice signal-to-IP packet converter circuit 32 converts the voice signal, thus corrected by the transmitter IF corrector circuit 31, to IP packets and sends out them to the IP network 2.

The above IP packets, transmitted over the IP network 2, are input to the other voice communications apparatus, or receiving station, 20. In the voice communications apparatus 20, the IP packet-to-voice signal converter circuit 41 decomposes the IP packets thus arrived to thereby restore the original voice signal and delivers the restored voice signal to the receiver F characteristic corrector circuit 42. While the restored voice signal has a frequency characteristic similar to one shown in FIG. 4B, the receiver F characteristic corrector circuit 42 with the correction frequency characteristic of FIG. 5C raises the frequency band components, which will be attenuated by the receiver characteristic, to thereby output a voice signal having the frequency characteristic of FIG. 5B. The resulting voice signal is fed to the receiving telephone set 12.

The telephone set body 12B included in the receiving telephone set 12 attenuates the higher- and lower-frequency components of the input voice signal in accordance with its receiver characteristic. However, because the above frequency components of the voice signal, when received by the receiving telephone set 12, have been raised in gain by the receiver F characteristic corrector circuit 42, the voice signal will be output from the telephone set body 12B to have its frequency characteristic which became flat as shown in FIG. 6 to substantially correspond to the voice signal captured by the transmitting telephone set 11. The voice signal with such a frequency characteristic is output from a receiver, such as an earphone or loudspeaker, 12R included in the telephone set 12.

As stated above, in the illustrative embodiment, even when a voice communication is held between the telephone sets 11 and 12, which belong to a general public switched telephone network, via the IP network or broad-band transmission path 2, broad-band voice signals can be transmitted because of the frequency characteristic correcting functions of the voice communications apparatus 10 and 20. The illustrative embodiment therefore successfully enhances voice quality.

An alternative embodiment of the voice communications system in accordance with the present invention will be described hereinafter. The system construction described with reference to FIG. 1 applies to the alternative embodiment also. The alternative embodiment may be the same as the earlier described embodiment except for the configuration of the transmitter F characteristic corrector circuit 31 and that of the receiver F characteristic corrector circuit 42 included in each of the voice communications apparatus 10 and 20.

Figure 7:
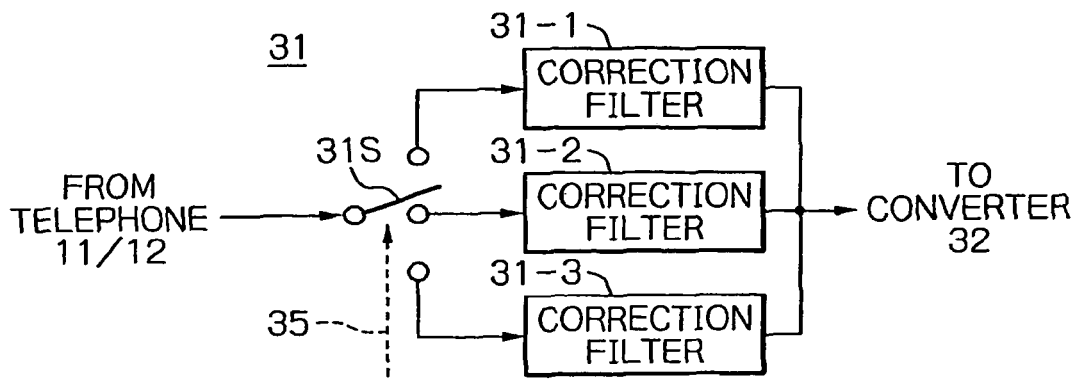
FIG. 7 is a schematic block diagram showing a transmission frequency characteristic corrector in accordance with an alternative embodiment of the present invention.

FIG. 7 shows the configuration of the transmitter F characteristic corrector circuit 31 included in the alternative embodiment. In the alternative embodiment, the receive F characteristic corrector circuit 42 may have the same configuration as the transmitter F characteristic corrector circuit 31 and is therefore not shown in FIG. 7 nor will be described specifically.

Figure 8A:
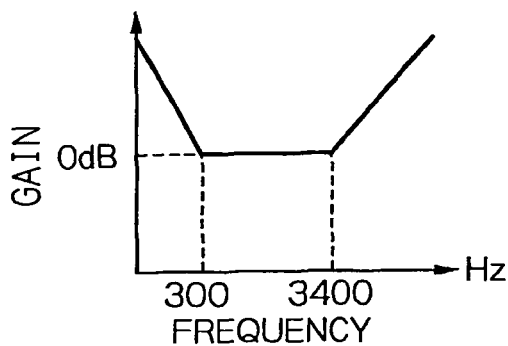
FIGS. 8A, 8B and 8C are graphs plotting the correction frequency characteristics of the correction filters shown in FIG. 7.
Figure 8B:
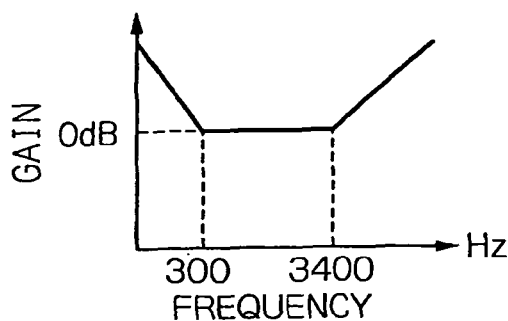
Figure 8C:
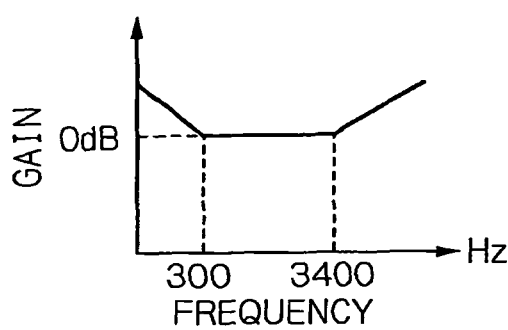

As shown in FIG. 7, the transmitter F characteristic corrector circuit 31 includes a plurality of correction filters, e.g. three correction filters 31-1, 31-2 and 31-3 in the illustrative embodiment and a switch 31S for selecting one of the correction filters 31-1 through 31-3. The correction filters 31-1, 31-2 and 31-3 respectively have specific correction frequency characteristics shown in FIGS. 8A, 8B and 8C, one of which is expected to match with the transmitter characteristic of the telephone set 11 or 12 associated therewith.

The switch 31S is adapted to select one of the correction filters 31-1 through 31-3 in response to a select signal 35 input to the transmitter F characteristic corrector circuit 31 from the control circuitry of the apparatus 11 or 12. The switch 31S, which may be provided on the input side of the correction filters 31-1 through 31-3 as shown, may alternatively be provided on the output side of the correction filters 31-1 through 31-3. Alternatively, in addition to the switch 31S, another switch like the switch 31S may be provided on the output side of the correction filters 31-1 through 31-3, if desired.

The select signal 35 meant for the switch 31S may be input by, e.g. a user or an engineer at the installation site, or may be automatically generated by the control circuitry of the apparatus 10 or 20. Further, the select signal 35 may be obtained from an external apparatus, e.g. a server on the IP network 2, FIG. 1. More specifically, if data representative of a relation between the type of the telephone set 10 or 20 and the correction frequency characteristic are stored in a server, not shown, on the IP network 2, then the select signal 31 can be obtained from the server by inputting the type of the telephone set 11 or 12 on, e.g. push buttons arranged on the telephone set.

For example, when the voice communications apparatus 10 or 20 is to be connected to the telephone set 11 or 12, respectively, the user of the apparatus 10 or 20 or an engineer in charge of installation may perform actual communication tests and then set optimum one of the correction filters 31-1 through 31-3 in the apparatus 10 or 20 to thereby select the optimum correction filter.

The operation of the alternative embodiment to follow the selection of one of the correction filters 31-1 through 31-3 may be identical with the operation of the embodiment described earlier and will therefore not be described specifically in order to avoid redundancy.

With the configuration described above, the alternative embodiment not only achieves the same advantages as the earlier described embodiment, but also further enhances communication quality by allowing an optimum correction frequency characteristic for a given type of telephone set to be selected.

A further alternative embodiment of the voice communications system in accordance with the present invention will be described hereinafter. The system construction described with reference to FIG. 1 may also be applied to the further alternative embodiment. FIG. 9 shows circuitry unique to each of the voice communications apparatus 10 and 20 included in the further alternative embodiment. In FIG. 9, structural parts and elements like those shown in FIG. 3 are designated with the identical reference numerals.

As shown in FIG. 9, the embodiment of the one voice communications apparatus 10 also includes the transmitter F characteristic corrector circuit 31, voice signal-to-IP packet converter circuit 32, IP packet-to-voice signal converter circuit 41, and receiver F characteristic corrector circuit 42 interconnected as illustrated. Although the embodiment of the one voice communications apparatus 10 will be described, the same is also applicable to the other voice communications apparatus 20, of course. In the illustrative embodiment, the apparatus 10 further includes four switches 51A through 51D, an FFT (Fast Fourier Transform) circuit or similar frequency analyzer 52, a white noise generator 53, and a mode controller 54. It is to be noted that the transmitter and receiver F characteristic corrector circuits 31 and 42 of the illustrative embodiment each are capable of varying the correction frequency characteristic thereof in response to control signals 37 and 39, respectively, generated by the FFT circuit 52.

With the illustrative embodiment, two different operational modes, i.e. a usual mode and an F characteristic setting mode are available. The F characteristic setting mode, which sets correction frequency characteristics, may be selected in response to, e.g. automatic detection of the initial connection of the telephone set 11 with the voice communications apparatus 10. In the F characteristic setting mode, the mode controller 54, which has various control connections 61, symbolically shown, which cause the various subsections of the apparatus 11 to operate in such a manner as to automatically set the correction frequency characteristics of the transmitter and receiver characteristic corrector circuits 31 and 42.

The switches 51A through 51D are configured to establish a particular signal path for each of the usual mode and F characteristic setting mode.

The frequency analyzer 52 comprises, e.g. FFT circuitry, and functions in the F characteristic setting mode. The frequency analyzer 52 is adapted to detect the frequency characteristic of a signal input from the telephone set 11 connected to the voice communications apparatus 10. The white noise generator 53, also functioning in the F characteristic setting mode, is adapted to generate white noise over the entire voice band.

In operation, the voice communications apparatus 10 is interconnected to the telephone set 11, FIG. 1, and made in the F characteristic setting mode, for example. When the F characteristic setting mode is selected, the mode controller 54 first connects all of the switches 51A through 51D to the terminals a thereof, and then causes the frequency analyzer to start operating. In this condition, a signal representative of background noise caught by the microphone 11S of the telephone set 11 and reflecting the transmitter characteristic of the telephone set body 11B is input to the frequency analyzer 52. In the illustrative embodiment, background noise is assumed to be white noise. In response, the frequency analyzer 52 determines the transmitter characteristic of the telephone set 11 and then causes the transmitter F characteristic corrector circuit 31 to select a correction frequency characteristic matching with the transmitter characteristic thus determined.

For example, in the application where the transmitter F characteristic corrector 31 has the configuration shown in FIG. 7, when the transmitter characteristic is detected by the frequency analyzer 52 such that it does not greatly attenuate the lower-frequency portion below 300 Hz inclusive or the higher-frequency portion above 3,400 Hz inclusive, the frequency analyzer 52 causes the transmitter F characteristic corrector circuit 31 to select the correction filter 31-3, FIG. 7. On the other hand, in an application in which a digital field, capable of varying a characteristic on a frequency basis, is applied to the transmitter F corrector circuit 31, the frequency analyzer 52 causes the transmitter F characteristic corrector circuit 31 to select an F characteristic that implements a characteristic inverse to the transmitter characteristic detected.

Subsequently, the mode controller 54 connects the switches 51A and 51B to the terminals b thereof, connects the switch 51C to its terminal a and connects the switch 51D to its terminal c, and then causes the frequency analyzer 52 and white noise generator 53 to start operating. The white noise generator 53 generates white noise. The white noise thus generated is effected by the receiver characteristic of the telephone set body 11B and then output from the loudspeaker 11R in the form of sound. The resulting sound is captured by the microphone 11S, effected by the transmitter characteristic of the telephone set body 11B, and then input to the frequency analyzer 52 via the transmitter F characteristic corrector circuit 31.

The transmitter F characteristic corrector circuit 31 is so set as to recover the frequency band components limited by the transmitter characteristic beforehand, as stated previously. Therefore, the signal input to the frequency analyzer may safely be considered to reflect only the receiver characteristic of the telephone set 11. The frequency analyzer 52 determines the receiver characteristic of the telephone set 11 and then causes the receiver F characteristic corrector 42 to select a correction frequency characteristic matching with the receiver characteristic.

After the above procedure, the mode controller 54 connects all of the switches 51A through 51D to the terminals b thereof to thereby establish the usual mode. The embodiment of the voice communications device applied to the other voice communications device 20 will of course operate in the same manner as described above.

As stated above, the illustrative embodiment measures the transmitter and receiver characteristics of the telephone set 11 or 12 connected to the voice communications apparatus 10 or 20, respectively, and then selects appropriate correction frequency characteristics. It follows that particular correction frequency characteristics can be set for each telephone set 11 or 12, further enhancing communication quality. Of course, the illustrative embodiment also achieves the same advantages as the embodiment described earlier.

A still further alternative embodiment of the voice communications system in accordance with the present invention will be described with reference to FIG. 10 hereinafter. The still further embodiment is similar to the embodiment shown in FIG. 9 except for the following. In FIG. 10, structural parts and elements like those shown in FIG. 9 are designated with the identical reference numerals and will not be described specifically in order to avoid redundancy. Briefly, when the transmitter and receiver characteristics of the telephone set 11 or 12 are similar to each other, the instant embodiment causes the voice communications apparatus 10 or 20 to operate in a different manner from the apparatus 10 or 20 of the FIG. 9 embodiment in the F characteristic setting mode.

As seen from FIG. 10, the switch 51D and white noise generator 53 are absent from the voice communications apparatus 10. FIG. 10 shows only the voice communication apparatus when applied to the voice communications apparatus 10. The same will be applicable to the voice communications apparatus 20. When the F characteristic setting mode is selected, the mode controller 54 connects the switches 51A, 51B and 51C to the terminals a thereof, and then causes the frequency analyzer 52 to start operating.

In the above condition, the microphone 11S of the telephone set 11 generates a signal representative of background noise caught thereby. In the illustrative embodiment, too, background noise is assumed to be white noise. Consequently, a signal, derived from the background noise and reflecting the transmitter characteristic of the telephone set body 11B, is input to the frequency analyzer 52. In response, the frequency analyzer 52 determines the transmitter characteristic of the telephone set 11 and then causes the transmitter and receiver F characteristic corrector circuits 31 and 42 to select respective correction frequency characteristics matching with the transmitter characteristic.

After the above procedure, the mode controller 54 connects all of the switches 51A, 51B and 51C to the terminals b thereof and then establishes the usual mode. The illustrative embodiment of the voice communications device applied to the other voice communications device 20 will of course operate in the same manner as described above.

With the configuration described above, the illustrative embodiment achieves the same advantages as the embodiment shown in FIG. 9.

Figure 11:
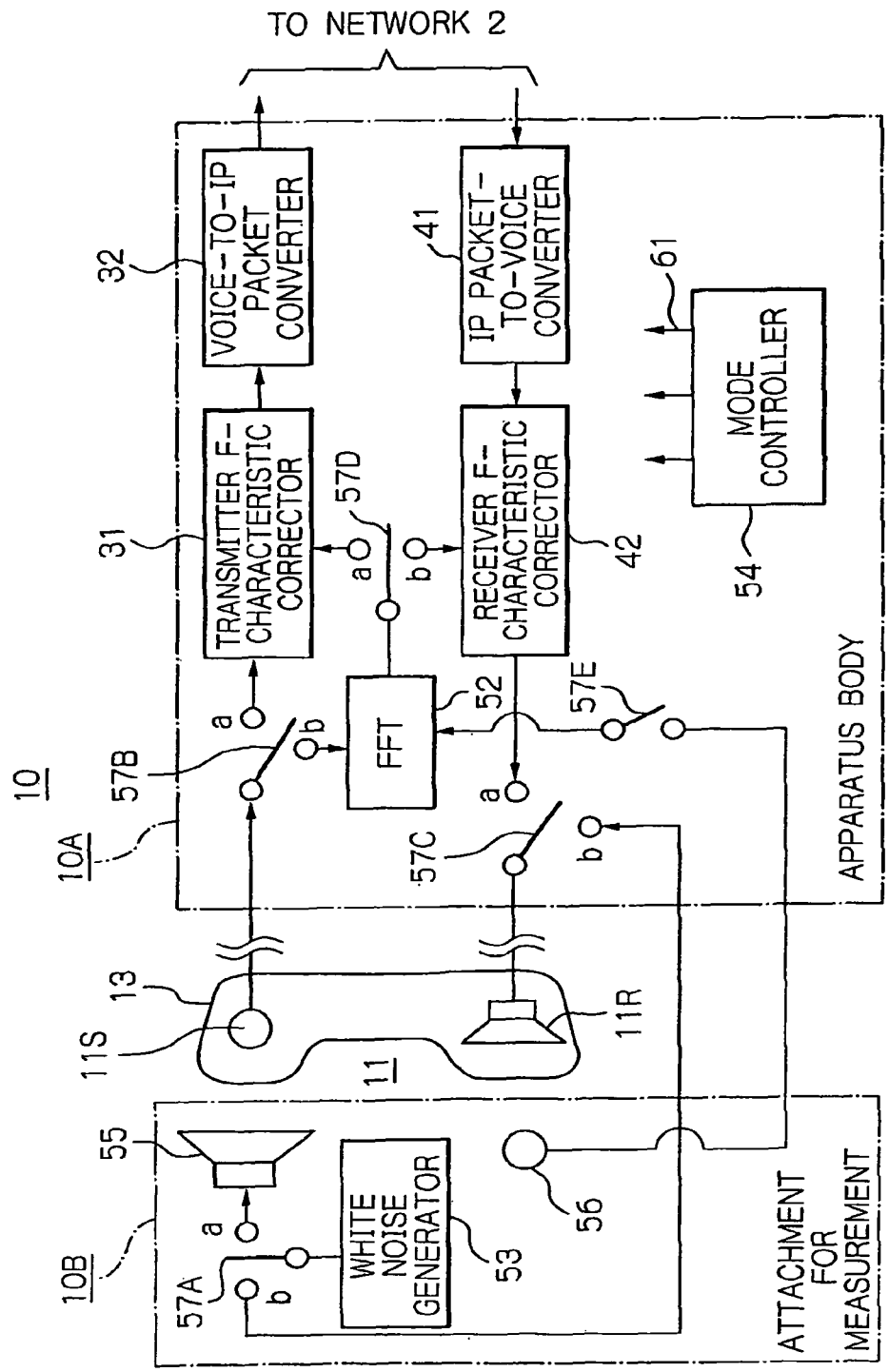
FIG. 11 is a schematic block diagram, similar to FIG. 9, showing a further alternative embodiment of the present invention.

Reference will now be made to FIG. 11 for describing still another alternative embodiment of the voice communications system in accordance with the present invention. The instant, illustrative embodiment is also similar to the embodiment shown in FIG. 9 except for the points described below. With the embodiment also, like structural parts and elements are designated with the identical reference numerals and will not be described specifically in order to avoid redundancy. In FIG. 11, only the one voice communications apparatus 10 is shown. However, as stated earlier, the other voice communications apparatus 20 may of course be of the same structure as the one apparatus 10.

As shown in FIG. 11, the voice communications apparatus 10 of the illustrative embodiment is generally made up of an apparatus body 10A and an attachment 10B used to measure F frequency characteristics. The attachment 10B, configured to operate only in the F characteristic setting mode, may be adapted to be manually coupled to the apparatus body 10A by, e.g. an installing engineer. Alternatively, the attachment 10B may be adapted to be fixedly coupled to and mechanically enclosed with the housing, not shown, of the apparatus body 10A, in which case an installer, for example, will take out the attachment 10B from the housing only in the F characteristic setting mode to operate it.

The attachment 10B includes a white noise generator 53, a loudspeaker 55, a microphone 56, and a switch 57A interconnected as shown. On the other hand, the apparatus body 10A includes the frequency analyzer 52, mode a controller 54 and switches 57B through 57E operatively assigned to the F characteristic setting mode and interconnected as illustrated.

In operation, the engineer positions the attachment 10B such that the loudspeaker 55 and microphone 56 face the microphone 11S and loudspeaker 11R, respectively, of a handset of the telephone set 11, prior to selecting the F characteristic setting mode. For this purpose, the attachment 10B may preferably be enclosed with its housing, not shown, which has a contour or shape configured such that when the handset 13 is put thereon by hand, the loudspeaker 55 and microphone 56 will naturally face the microphone 11S and loudspeaker 11R, respectively.

When the F characteristic setting mode is selected, the mode controller 54 first connects the switches 57A and 57B to the terminals a and b thereof, respectively. The controller 54 also turns off the switch 57C, i.e. connects it to neither its terminal a nor its terminal b. The controller 54 connects the switch 57D to its terminal a, and tuns off the switch 57E. Subsequently, the mode controller 54 causes the white noise generator 53 and frequency analyzer 52 to start operating.

The white noise generator 53 in turn generates white noise. The white noise thus generated is transduced by the loudspeaker 55 into sound, which is in turn output from the loudspeaker 55 and then caught by the microphone 11S of the telephone set 11, which is connected to the voice communications apparatus 10. As a result, a signal, reflecting the transmitter characteristic of the telephone set body 11B is input to the frequency analyzer 52. In response, the frequency analyzer 52 determines the transmitter characteristic of the telephone set 11 and then causes the transmitter F characteristic corrector circuit 31 to select a correction frequency characteristic matching with the transmitter characteristic.

Subsequently, the mode controller 54 connects the switch 57A to its terminal b, turns off the switch 518, i.e. connects it to neither its terminal a nor its terminal b, connects the switches 51C to respective terminals b thereof, and turns on the switch 57E. The mode controller 54 then causes the white noise generator 53 and frequency analyzer 52 to start operating. White noise produced from the white noise generator 53 is effected by the receiver characteristic of the telephone set body 11B, output via the loudspeaker 11R, captured by the microphone 56, and then delivered to the frequency analyzer 52 in the form of a signal.

The signal thus input to the frequency analyzer 52 reflects only the receiver characteristic of the telephone set 11 although it is derived from the white noise. The frequency analyzer 52 determines the receiver characteristic of the telephone set 11 and causes the receiver F characteristic corrector circuit 42 to select a correction frequency characteristic matching with the receiver characteristic.

After the above procedure, the mode controller 54 turns off the switch 57A, i.e. connects it to neither its terminal a nor its terminal b, connects the switches 57B and 57C to the terminals a thereof, turns off the switch 57D, i.e. connects it to neither its terminal a nor its terminal b, and tuns off the switch 57E, thereby restoring the usual mode. The instant embodiment of the voice communications device applied to the other voice communications device 20 will of course operate in the same manner as described above.

As stated above, the illustrative embodiment measures both of the transmitter and receiver characteristics by using white noise generated by the white noise generator 53, thereby selecting adequate correction frequency characteristics. This further enhances communication quality. Of course, the illustrative embodiment also achieves the same advantages as the embodiment shown in FIG. 9.

In the embodiments shown and described, the voice communications apparatus is provided with the function of correcting frequency characteristics in accordance with the transmitter and receiver characteristics of a telephone set, and the function of communicating with an IP network. Alternatively, the voice communications apparatus may be provided only with the frequency characteristic correcting function. Further, the voice communications apparatus may be implemented as apparatus having any other functions, e.g. gateway apparatus capable of selectively connecting a telephone set to a general public switched telephone network or an IP network. In such a case, the circuitry unique to the present invention may be configured to operate only when a telephone set is connected to an IP network.

Whereas the voice communications apparatus has been shown and described as being separate from a telephone set, the former may be built in the latter. This can be done without changing the conventional basic design of a telephone set, insuring high communication quality available with broadband communication.

In the illustrative embodiments, the transmitter F characteristic corrector circuit is configured such that the frequency characteristic becomes flat over the entire voice band after corrected. Also, the receiver F characteristic corrector circuit is configured such that the signal corrected becomes flat over the entire voice band after effected by a receiver characteristic. Alternatively, the transmitter F characteristic corrector circuit may be configured such that the frequency characteristic, after corrected, will be an intended or desired frequency characteristic while the receiver F characteristic corrector circuit may be configured such that the signal, after effected by a receiver characteristic, will have an intended frequency characteristic. In such a case, the desired frequency characteristics do not have to fully correspond to each other. Such desired frequency characteristics should only enhance the quality of communications held on a broad-band transmission path more than when the quality is effected only by the transmitter and receiver characteristics.

In summary, it will be seen that the present invention provides a voice communications apparatus and a voice communication system capable of insuring high voice quality even when an existing telephone set, for example, uses a broadband transmission path.

The entire disclosure of Japanese patent application Nos. 2002-379082 and 2003-071826 respectively filed on Dec. 27, 2002 and Mar. 17, 2003, including the specifications, claims, accompanying drawings and abstracts of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

The invention claimed is:

1. A voice communications apparatus intervening between a telephone set and a broad-band transmission path that has a communication band broader than a voice band limited by a transmitter characteristic and a receiver characteristic of the telephone set, comprising:
   a transmitter frequency characteristic corrector having a first correction frequency characteristic and configured to correct a frequency characteristic of a first signal inputted from the telephone set; and
   a receiver frequency characteristic corrector having a second correction frequency characteristic and configured to correct a frequency characteristic of a second signal to be inputted to the telephone set.

2. The apparatus in accordance with claim 1, wherein the first correction frequency characteristic and the second correction frequency characteristic are variable.

3. A voice communications system for connecting two telephone sets via a broad-band communication path having a communication band broader than a voice band limited by a transmitter characteristic and a receiver characteristic of each of the two telephone sets, the system comprising a voice communication apparatus,
   wherein each of the two telephone sets is connected to the broad-band communication path via a voice communication apparatus, said voice communication apparatus including:
      a transmitter frequency characteristic corrector having a first correction frequency characteristic and configured to correct a frequency characteristic of a first signal inputted from the telephone set; and
      a receiver frequency characteristic corrector having a second correction frequency characteristic and configured to correct a frequency characteristic of a second signal to be inputted to the telephone set.

4. The system in accordance with claim 3, wherein the first correction frequency characteristic and the second correction frequency characteristic are variable.

5. The apparatus in accordance with claim 1, wherein said transmitter frequency characteristic corrector is configured to correct the frequency characteristic of the first signal inputted from the telephone set so as to render the first signal in matching relation to broad-band communications available with the broad-band transmission path.

6. The apparatus in accordance with claim 5, wherein said transmitter frequency characteristic corrector is configured to partially enhance a gain of the voice band limited by the transmitter characteristic of the telephone set to thereby correct the frequency characteristic of the first signal inputted from the telephone set.

7. The apparatus in accordance with claim 6, wherein said transmitter frequency characteristic corrector includes an analog or digital filter having a filter characteristic partially enhancing the gain of the limited voice band.

8. The apparatus in accordance with claim 1, wherein said receiver frequency characteristic corrector is configured to correct the frequency characteristic of the second signal to be inputted to the telephone set so as to render the second signal in matching relation to broad-band communications available with the broad-band transmission path.

9. The apparatus in accordance with claim 8, wherein said receiver frequency characteristic corrector is configured to partially raise frequency band components to be attenuated by the receiver characteristic of the telephone set to thereby correct the frequency characteristic of the second signal to be inputted to the telephone set.

10. The apparatus in accordance with claim 9, wherein said receiver frequency characteristic corrector includes an analog filter having a filter characteristic partially raising the frequency band components.

11. The system in accordance with claim 3, wherein said transmitter frequency characteristic corrector is configured to correct the frequency characteristic of the first signal inputted from the telephone set so as to render the first signal in matching relation to broad-band communications available with the broad-band transmission path.

12. The system in accordance with claim 11, wherein said transmitter frequency characteristic corrector is configured to partially enhance a gain of the voice band limited by the transmitter characteristic of the telephone set to thereby correct the frequency characteristic of the second signal inputted from the telephone set.

13. The system in accordance with claim 12, wherein said transmitter frequency characteristic corrector includes an analog or digital filter having a filter characteristic partially enhancing the gain of the limited voice band.

14. The system in accordance with claim 3, wherein said receiver frequency characteristic corrector is configured to correct the frequency characteristic of the second signal to be inputted to the telephone set so as to render the second signal in matching relation to broad-band communications available with the broad-band transmission path.

15. The system in accordance with claim 14, wherein said receiver frequency characteristic corrector is configured to partially raise frequency band components to be attenuated by the receiver characteristic of the telephone set to thereby correct the frequency characteristic of the second signal to be inputted to the telephone set.

16. The system in accordance with claim 15, wherein said receiver frequency characteristic corrector includes an analog filter having a filter characteristic partially raising the frequency band components.

* * * * *